United States Patent
Terashima et al.

(10) Patent No.: US 8,801,113 B2
(45) Date of Patent: Aug. 12, 2014

(54) BRAKE APPARATUS

(75) Inventors: Kazuya Terashima, Isehara (JP); Koji Numakura, Atsugi (JP); Katsuma Tsuruoka, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 210 days.

(21) Appl. No.: 13/301,880

(22) Filed: Nov. 22, 2011

(65) Prior Publication Data

US 2012/0139331 A1 Jun. 7, 2012

(30) Foreign Application Priority Data

Dec. 6, 2010 (JP) ................................. 2010-271206

(51) Int. Cl.
*B60T 8/48* (2006.01)
(52) U.S. Cl.
USPC ................................. 303/119.3; 303/DIG. 10
(58) Field of Classification Search
USPC ................. 303/10, 119.3, DIG. 10, DIG. 11
See application file for complete search history.

(56) References Cited

U.S. PATENT DOCUMENTS

| 7,118,183 B2 * | 10/2006 | Hinz et al. ................ 303/119.3 |
| 7,543,896 B2 | 6/2009 | Ariki et al. |
| 7,967,394 B2 * | 6/2011 | Lee et al. .................... 303/116.2 |
| 2001/0005100 A1 * | 6/2001 | Kamiya ............................. 303/5 |
| 2007/0228820 A1 * | 10/2007 | Nakamura ................ 303/119.3 |
| 2011/0062773 A1 * | 3/2011 | Misunou et al. ............ 303/6.01 |

FOREIGN PATENT DOCUMENTS

| JP | 11-208440 | 8/1999 |
| JP | 2006-151362 | 6/2006 |
| JP | 3937554 | 4/2007 |
| JP | 2008-106905 | 5/2008 |

* cited by examiner

*Primary Examiner* — Bradley King
(74) *Attorney, Agent, or Firm* — Antonelli, Terry, Stout & Kraus, LLP.

(57) ABSTRACT

A brake apparatus including a housing, a piston body disposed within each of a pair of closed-ended bores formed in the housing, a first elastic member that biases the piston body toward a closed end of the respective bores, a fluid passage opened to the closed end of the respective bores, a pressure regulating valve disposed in the fluid passage, and a rotary gear pump disposed in a region between the pressure regulating valve disposed in the fluid passage opened to the closed end of one of the bores and the pressure regulating valve disposed in the fluid passage opened to the closed end of the other of the bores. The fluid passages are formed to be offset from respective central axes of the piston bodies in such a direction that the fluid passages are spaced apart from each other.

12 Claims, 6 Drawing Sheets

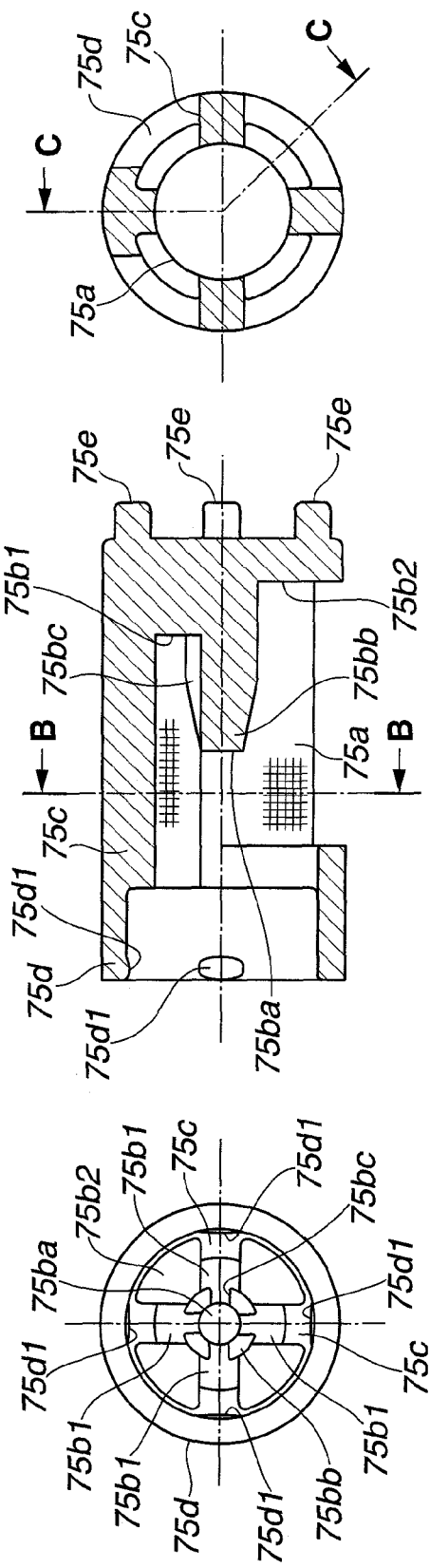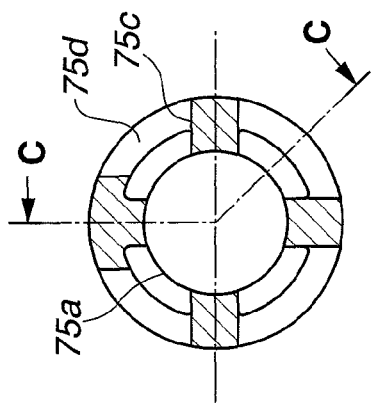

BRAKE APPARATUS

BACKGROUND OF THE INVENTION

The present invention relates to a brake apparatus that has a reservoir function of reserving a brake fluid.

Japanese Patent No. 3937554 discloses a brake apparatus usable in an anti-lock brake system (ABS), etc., in which a piston for a reservoir and a pressure regulating valve disposed above the piston are arranged such that central axes thereof are aligned with each other.

SUMMARY OF THE INVENTION

However, in the above-described conventional art, the pressure regulating valve is constituted of multiple parts and has an axial length elongated for stroke in an axial direction thereof. Therefore, it is required to arrange a reservoir to be spaced from a pump part disposed in the vicinity of the reservoir in order to avoid interference therebetween. This leads to upsizing of a whole housing of the brake apparatus.

It is an object of the present invention to provide a brake apparatus serving for a compact housing thereof.

The other objects and features of this invention will become understood from the following description with reference to the accompanying drawings.

In one aspect of the present invention, there is provided a brake apparatus including:
  a housing;
  a piston body disposed within each of a pair of closed-ended bores formed in the housing;
  a first elastic member that biases the piston body toward a closed end of the respective bores;
  a fluid passage opened to the closed end of the respective bores, the fluid passage having a diameter smaller than a diameter of the respective bores,
  a pressure regulating valve disposed in the fluid passage, the pressure regulating valve including a valve element, a seat portion that is brought into contact with the valve element, a rod disposed between a crown surface of the piston body and the valve element, the rod acting to move the valve element apart from the seat portion, and a second elastic member having one end contacted with the valve element and biasing the valve element toward the seat portion, the second elastic member having an elastic force smaller than that of the first elastic member, and
  a rotary gear pump operative to suck brake fluid through the pressure regulating valve;
  wherein the rotary gear pump is disposed in a region between the pressure regulating valve disposed in the fluid passage opened to the closed end of one of the bores and the pressure regulating valve disposed in the fluid passage opened to the closed end of the other of the bores, and
  the fluid passages are formed to be offset from respective central axes of the piston bodies in such a direction that the fluid passages are spaced apart from each other.

In a further aspect of the present invention, there is provided a brake apparatus including:
  a housing;
  a pair of closed-ended bores formed in the housing;
  a piston body disposed within the respective bores;
  a retainer fixed to an open end portion of the respective bores;
  a first elastic member that is retained between the retainer and the piston body and biases the piston body toward a closed end of the respective bores;
  a fluid passage opened to the closed end of the respective bores;
  a pressure regulating valve disposed in the fluid passage, the pressure regulating valve including a valve element, a seat portion that is brought into contact with the valve element, a rod disposed between a crown surface of the piston body and the valve element, the rod acting to move the valve element apart from the seat portion, and a second elastic member having one end contacted with the valve element and biasing the valve element toward the seat portion, the second elastic member having an elastic force smaller than that of the first elastic member,
  a rotary gear pump operative to suck brake fluid through the pressure regulating valve; and
  a motor that is mounted to a front surface of the housing and drives the rotary gear pump;
  wherein when viewed from a side of the front surface of the housing, the rotary gear pump is disposed in a region between the pressure regulating valve disposed in the fluid passage opened to the closed end of one of the bores and the pressure regulating valve disposed in the fluid passage opened to the closed end of the other of the bores, and the fluid passages are formed to be offset from respective central axes of the piston bodies in such a direction that the fluid passages are spaced apart from each other.

In a still further aspect of the present invention, there is provided a brake apparatus including:
  a housing;
  a pair of closed-ended bores formed in the housing;
  a piston body disposed within the respective bores;
  a retainer fixed to an open end portion of the respective bores;
  a first elastic member that is retained between the retainer and the piston body and biases the piston body toward a closed end of the respective bores;
  a fluid passage opened to the closed end of the respective bores;
  a pressure regulating valve disposed in the fluid passage, the pressure regulating valve including a valve element, a seat portion that is brought into contact with the valve element, a rod disposed between a crown surface of the piston body and the valve element, the rod acting to move the valve element apart from the seat portion, and a second elastic member having one end contacted with the valve element and biasing the valve element toward the seat portion, the second elastic member having an elastic force smaller than that of the first elastic member,
  a rotary gear pump operative to suck brake fluid through the pressure regulating valve; and
  a motor that is mounted to a front surface of the housing and drives the rotary gear pump;
  wherein in a projected view of the housing observed from a side of the front surface of the housing, the fluid passages are formed to be offset from respective central axes of the piston bodies in such a direction that the fluid passages are spaced apart from each other, and the fluid passages are arranged to sandwich the rotary gear pump therebetween.

The present invention can provide a brake apparatus capable of enhancing a freedom of layout of a rotary gear pump and serving for a compact housing.

BRIEF DESCRIPTION OF THE DRAWINGS

FIG. 6A to FIG. 6C are diagrams showing a detailed construction of the filter member as shown in FIG. 5.

DETAILED DESCRIPTION OF THE INVENTION

Referring to FIG. 1 to FIG. 7, a brake apparatus according to an embodiment of the present invention will be explained hereinafter.

[Construction of Hydraulic Circuit of Hydraulic Brake Control System]

Figure 1:
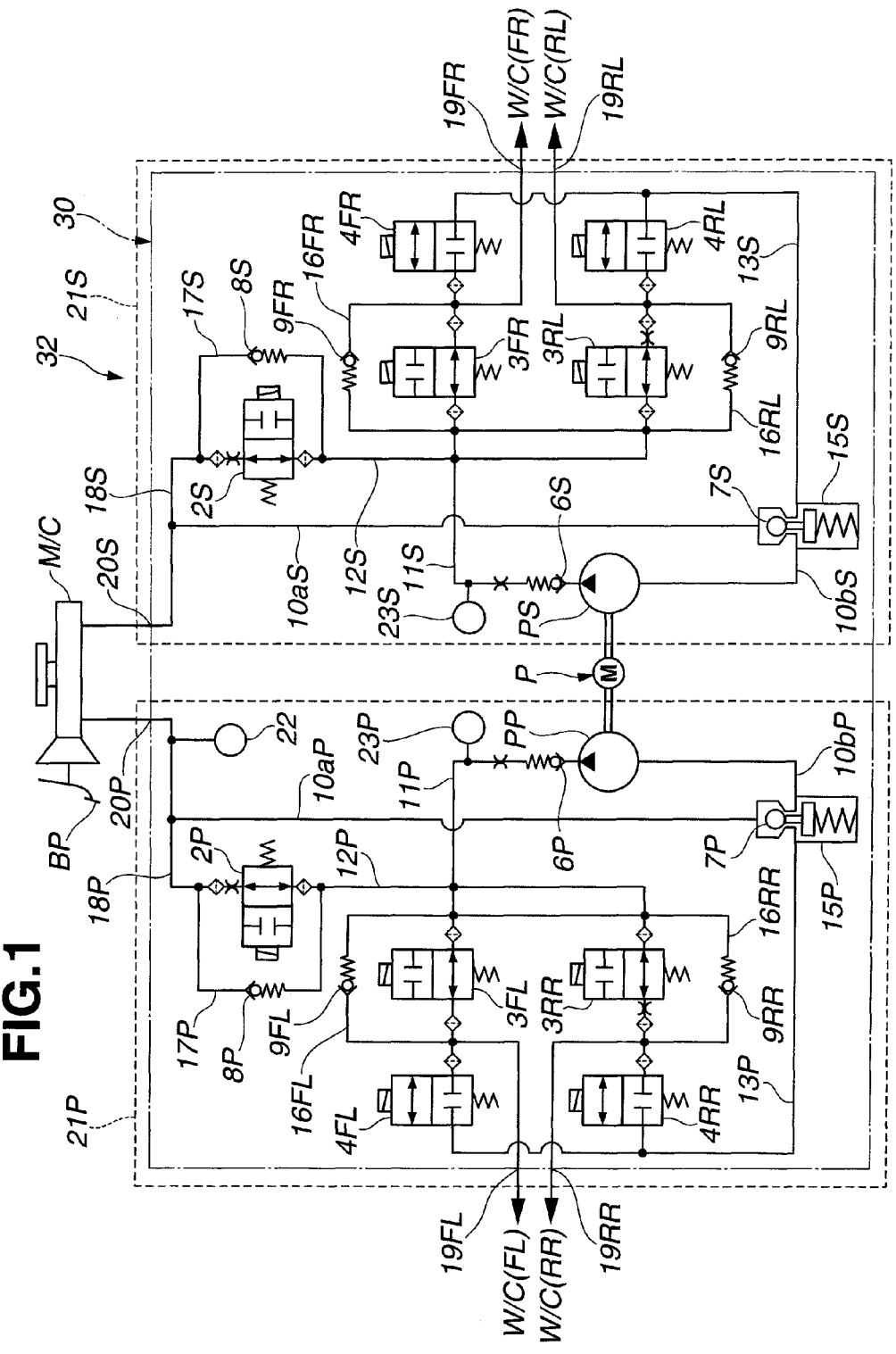
FIG. 1 is a hydraulic circuit diagram of a hydraulic brake control system to which a brake apparatus according to an embodiment of the present invention is applicable.

FIG. 1 is a hydraulic circuit diagram of hydraulic brake control system 32 according to an embodiment of the present invention. As shown in FIG. 1, the hydraulic circuit is formed in hydraulic control unit 30 disposed between master cylinder M/C and wheel cylinder W/C. Hydraulic control unit 30 includes generally rectangular solid-shaped housing 31 cut out from an aluminum block, and a plurality of fluid passages formed in housing 31, pump unit P, motor M, and a plurality of valves as explained below.

Hydraulic brake control system 32 performs hydraulic control in accordance with the hydraulic pressure requested in vehicle dynamics control (VDC) and anti-lock brake system (ABS) control by a controller. Hydraulic brake control system 32 has a so-called X piping construction including two systems constituted of P system hydraulic circuit 21P and S system hydraulic circuit 21S. Wheel cylinder W/C(FL) for a left front wheel and wheel cylinder W/C(RR) for a right rear wheel are connected to the P system. Wheel cylinder W/C(FR) for a right front wheel and wheel cylinder W/C(RL) for a left rear wheel are connected to the S system. Hydraulic brake control system 32 and respective wheel cylinders W/C are connected to wheel cylinder ports 19RL, 19FR, 19FL, 19RR which are formed on an upper surface of housing 31. Pump unit P is a tandem gear pump in which rotary gear pumps PP and PS constituted of a pair of external gears and disposed in the P system and the S system, respectively, are driven by single motor M.

Master cylinder M/C and hydraulic control unit 30 are connected with each other through fluid passages 18P, 18S and master cylinder ports 20P, 20S formed on a port connecting surface of housing 31. Fluid passage 18P and a suction side of gear pump PP are connected with each other through fluid passages 10aP, 10bP. Fluid passage 18S and a suction side of gear pump PS are connected with each other through fluid passages 10aS, 10bS. Master cylinder pressure sensor 22 is disposed on fluid passage 18P between master cylinder port 20P and a connecting portion in which fluid passage 18P is connected with fluid passage 10aP.

A discharge side of gear pump PP and respective wheel cylinders W/C(FL), W/C(RR) are connected with each other through fluid passages 11P. A discharge side of gear pump PS and respective wheel cylinders W/C(FR), W/C(RL) are connected with each other through fluid passages 11S. Pressure increasing valves 3FL, 3RR corresponding to wheel cylinders W/C(FL), W/C(RR) are disposed on fluid passage 11P, which are a solenoid valve of a normally open type. Pressure increasing valves 3FR, 3RL corresponding to wheel cylinders W/C(FR), W/C(RL) are disposed on fluid passage 11S, which are a solenoid valve of a normally open type. Check valve 6P is disposed on fluid passage 11P between gear pump PP and pressure increasing valves 3FL, 3RR. Check valve 6P allows a flow of brake fluid in a direction from gear pump PP toward pressure increasing valves 3FL, 3RR and inhibits a flow of brake fluid in a reverse direction from pressure increasing valves 3FL, 3RR toward gear pump PP. Check valve 6S is disposed on fluid passage 11S between gear pump PS and pressure increasing valves 3FR, 3RL. Check valve 6S allows a flow of brake fluid in a direction from gear pump PS toward pressure increasing valves 3FR, 3RL and inhibits a flow of brake fluid in a reverse direction from pressure increasing valves 3FR, 3RL toward gear pump PS. Discharge pressure sensor 23P is disposed on fluid passage 11P between pressure increasing valves 3FL, 3RR and gear pump PP. Discharge pressure sensor 23S is disposed on fluid passage 11S between pressure increasing valves 3FR, 3RL and gear pump PS.

Fluid passage 11P includes bypass passages 16FL, 16RR which bypass pressure increasing valves 3FL, 3RR, respectively. Check valves 9FL, 9RR are disposed on bypass passages 16FL, 16RR, respectively. Check valves 9FL, 9RR allow a flow of brake fluid in a direction from wheel cylinders W/C(FL), W/C(RR) toward gear pump PP, and inhibit a flow of brake fluid in a reverse direction from gear pump PP toward wheel cylinders W/C(FL), W/C(RR). Fluid passage 11S includes bypass passages 16FR, 16RL which bypass pressure increasing valves 3FR, 3RL, respectively. Check valves 9FR, 9RL are disposed on bypass passages 16FR, 16RL, respectively. Check valves 9FR, 9RL allow a flow of brake fluid in a direction from wheel cylinders W/C(FR), W/C(RL) toward gear pump PS, and inhibit a flow of brake fluid in a reverse direction from gear pump PS toward wheel cylinders W/C (FR), W/C(RL).

Master cylinder M/C is connected with fluid passages 11P, 11S through fluid passages 12P, 12S, respectively. Fluid passage 11P and fluid passage 12P are merged with each other between gear pump PP and pressure increasing valves 3FL, 3RR. Fluid passage 11S and fluid passage 12S are merged with each other between gear pump PS and pressure increasing valves 3FR, 3RL. Outflow gate valves 2P, 2S are disposed on fluid passages 12P, 12S, respectively, each being a normally open solenoid valve. Fluid passages 12P, 12S include bypass passages 17P, 17S which bypass outflow gate valves 2P, 2S, respectively. Check valves 8P, 8S are disposed on bypass passages 17P, 17S, respectively. Check valve 8P allows a flow of brake fluid in a direction from master cylinder M/C toward wheel cylinders W/C(FL), W/C(RR), and inhibits a flow of brake fluid in a reverse direction from wheel cylinders W/C(FL), W/C(RR) toward master cylinder M/C. Check valve 8S allows a flow of brake fluid in a direction from master cylinder M/C toward wheel cylinders W/C(FR), W/C (RL), and inhibits a flow of brake fluid in a reverse direction from wheel cylinders W/C(FR), W/C(RL) toward master cylinder M/C. Master cylinder M/C and reservoirs 15P, 15S are connected with each other through fluid passages 10aP, 10aS, respectively. Pressure regulating valve 7P is disposed on fluid passage 10aP between reservoir 15P and master cylinder M/C. Pressure regulating valve 7S is disposed on fluid passage 10aS between reservoir 15S and master cylinder M/C. Pressure regulating valves 7P, 7S each have a function of a check valve.

Reservoir 15P is disposed on a suction side of gear pump PP and connected with the suction side of gear pump PP through fluid passage 10bP. Reservoir 15S is disposed on a suction side of gear pump PS and connected with the suction side of gear pump PS through fluid passage 10bS.

Wheel cylinders W/C(FL), W/C(RR) are connected with fluid passage 10bP through fluid passage 13P. Pressure reducing valves 4FL, 4RR each being a normally closed solenoid valve are disposed on fluid passage 13P. Fluid passage 13P and fluid passage 10bP are merged with each other between pressure regulating valve 7P and reservoir 15P. Wheel cylinders W/C(FR), W/C(RL) are connected with fluid passage 12S through fluid passage 13S. Fluid passage 13S and fluid passage 10bS are merged with each other between pressure regulating valve 7S and reservoir 15S. Pressure reducing valves 4FR, 4RL each being a normally closed solenoid valve are disposed on fluid passage 13S.

Next, an operation of pressure regulating valves 7P, 7S respectively disposed adjacent to reservoirs 15P, 15S are explained. In a normal braking condition, that is, in a non-operating condition of the respective valves and pumps, when a brake pressure is generated in master cylinder M/C, pressure regulating valves 7P, 7S are moved to a close position to thereby block fluid communication between master cylinder M/C and reservoirs 15P, 15S. The brake fluid in master cylinder M/C is supplied to wheel cylinders W/C(FL), W/C(RR), W/C(FR), W/C(RL) through fluid passages 18P, 18S. Next, upon executing ABS control, at an initial stage, pressure increasing valves 3FL, 3RR, 3FR, 3RL are moved to a close position, and pressure reducing valves 4FL, 4RR, 4FR, 4RL are moved to an open position. The brake fluid in wheel cylinders W/C(FL), W/C(RR), W/C(FR), W/C(RL) is flowed into reservoirs 15P, 15S through fluid passages 13P, 13S. At this time, the brake fluid flowed into reservoirs 15P, 15S is sucked by pumping action of pump unit P, and then is returned to master cylinder M/C through fluid passages 11P, 11S. Upon executing VDC, outflow gate valves 2P, 2S are moved to a close position, pressure increasing valve(s) 3FL, 3RR, 3FR, 3RL corresponding to desired wheel(s) is moved to an open position, and then pump unit P is operated. In this condition, even when pressure regulating valves 7P, 7S are in the close position, an inside pressure of respective reservoirs 15P, 15S are reduced by sucking action of pump unit P so that pressure regulating valves 7P, 7S are allowed to move to the open position. As a result, the brake fluid is sucked from master cylinder M/C, and then the brake fluid pressurized is supplied to wheel cylinder(s) W/C(FL), W/C(RR), W/C(FR), W/C(RL) corresponding to the desired wheel(s).

[Construction of Housing]

Figure 2B:
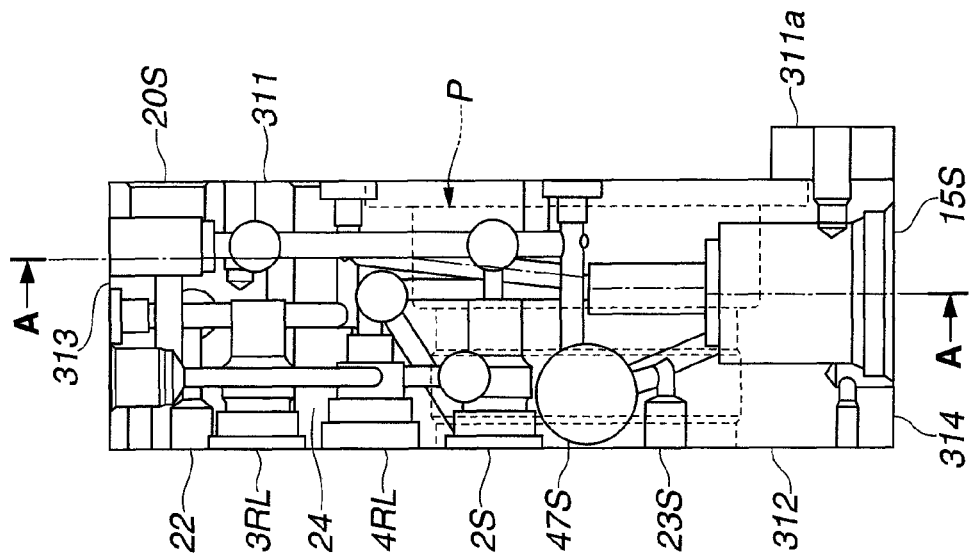
FIG. 2A and FIG. 2B are skeleton diagrams of a housing of the brake apparatus according to the embodiment.
Figure 2A:
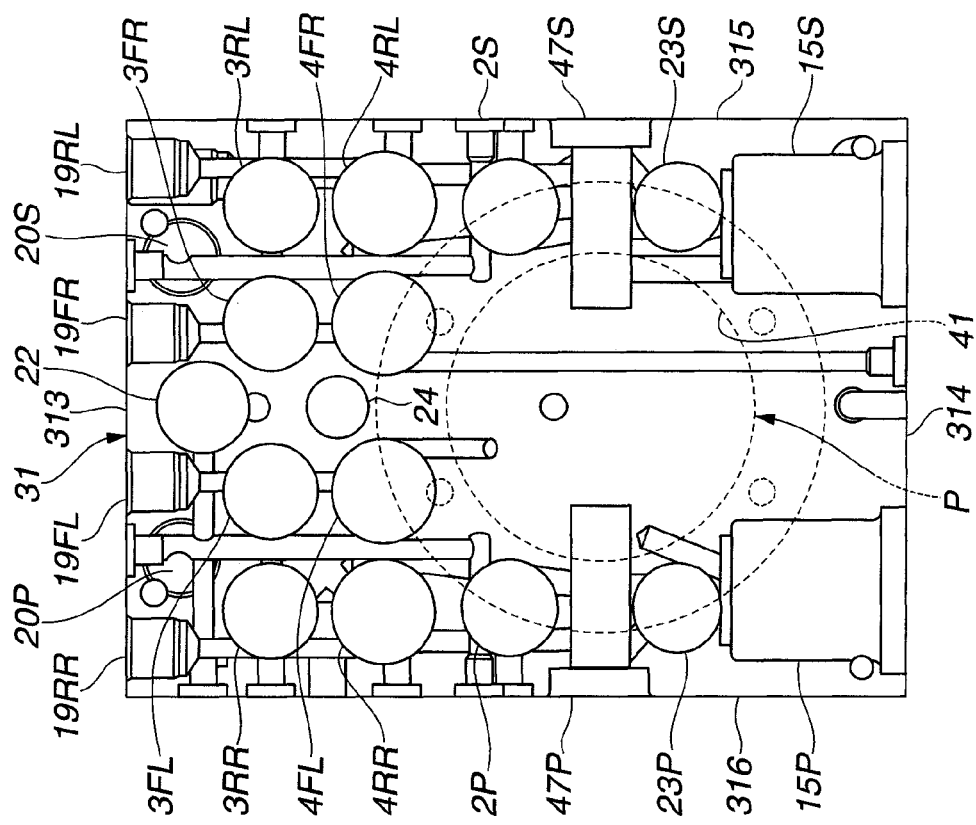

FIG. 2A and FIG. 2B are skeleton diagrams of housing 31 of the brake apparatus according to the embodiment. For simple illustration, FIG. 2A and FIG. 2B show housing 31 from which the respective valves and motor M are dismounted. In the following, a surface to which master cylinder port 20P, 20S are opened is front surface 311, a surface disposed on the opposite side of front surface 311 is rear surface 312, a surface to which wheel cylinder ports 19FL, 19RR, 19FR, 19RL are opened is upper surface 313, a surface disposed on the opposite side of upper surface 313 is lower surface 314, a surface disposed on the left side of front surface 311 when viewed from the side of front surface 311 is left side surface 315, and a surface disposed on the right side of front surface 311 when viewed from the side of front surface 311 is right side surface 316. FIG. 2A is a diagram of housing 31 when viewed from the side of rear surface 312. FIG. 2B is a diagram of housing 31 when viewed from the side of left side surface 315.

Housing 31 has a generally rectangular parallelepiped shape. Motor M is mounted to front surface 311. Mounted to rear surface 312 are the respective solenoid valves, i.e., outflow gate valves 2P, 2S, pressure increasing valves 3FL, 3RR, 3FR, 3RL, pressure reducing valves 4FL, 4RR, 4FR, 4RL, and an electric unit that drivingly controls these solenoid valves. The electric unit includes a circuit board that carries out preset calculation in response to input signals of a wheel speed sensor, etc. disposed on the vehicle, and outputs electrical signals to a solenoid mounted on the respective solenoid valves and motor M. The electric unit is accommodated within a unit case. Housing 31 includes power supply hole 24 that extends through front surface 311 and rear surface 312. The electric unit and motor M are connected with each other by inserting an electrode of motor M to power supply hole 24.

Further, housing 31 includes valve mounting holes to which the respective solenoid valves are mounted by press-fitting or caulking, a plurality of fluid passages connecting the respective ports and the respective solenoid valves with each other, ports connected with the respective cylinders (wheel cylinder W/C(FL), W/C(RR), W/C(FR), W/C(RL) and master cylinder M/C), and holes in which reservoirs 15P, 15S are respectively disposed. These holes, fluid passages and ports are formed by drilling from an outside of housing 31 into respective surfaces 311 to 316.

Master cylinder port 20P, 20S are formed to be opened to front surface 311 on the side of upper surface 313. Pump unit P is disposed in generally cylindrical accommodating portion 41 that extends through housing 31 from front surface 311 to rear surface 312. An end plate is mounted to one end of accommodating portion 41 to close an opening thereof on the side of rear surface 312. Discharge part accommodating holes 47P, 47S are formed to be opened to left side surface 315 and right side surface 316 in a direction substantially perpendicular to accommodating portion 41, respectively. Disposed within discharge part accommodating holes 47P, 47S, respectively, are check valves 6P, 6S which are connected to discharge fluid passages of pump unit P.

Figure 3:
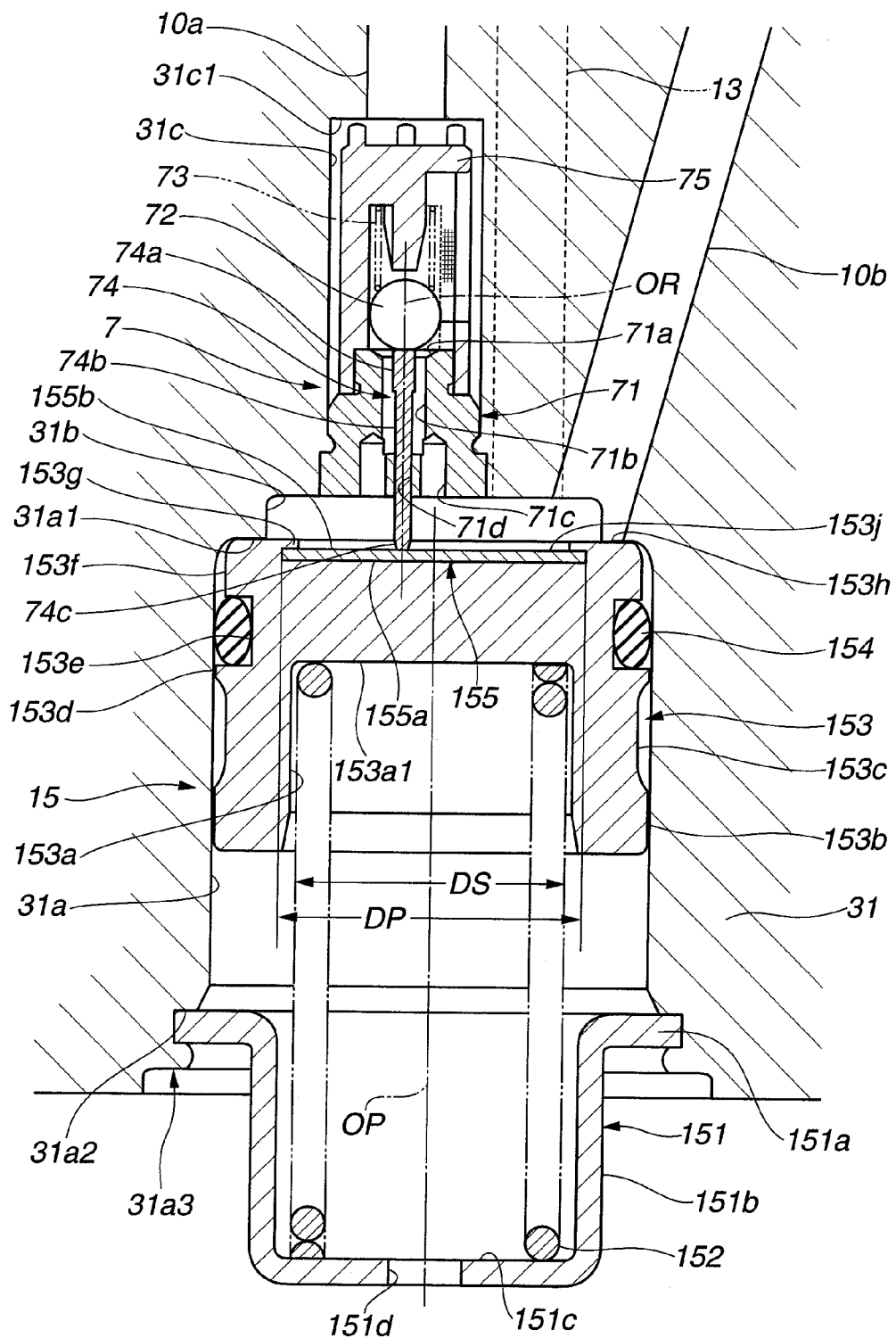
FIG. 3 is an enlarged partial cross section of the brake apparatus according to the embodiment, showing a construction of a reservoir.

FIG. 3 is an enlarged partial cross section of the brake apparatus according to the embodiment, showing a construction of reservoir 15 on the side of the P system. However, reservoir 15 (i.e., reservoir 15S) on the side of the S system is arranged symmetrically to reservoir 15 (i.e., reservoir 15P) on the side of the P system with respect to a vertically extending plane that contains a rotation axis of pump unit P and extends parallel to side surfaces 315, 316 of housing 31. Therefore, in FIG. 3, the symbols P and S respectively indicating the P system and the S system are emitted from the respective reference numerals. As shown in FIG. 3, housing 31 includes cylindrical closed-ended bore 31a that has one closed end and upwardly extends from lower surface 314 of housing 31. Bore 31a accommodates piston body 153 as explained later. Retainer holding surface 31a2 is formed on a lower open end portion of bore 31a on an inner circumferential surface of housing 31 which defines bore 31a. Retainer holding surface 31a2 holds retainer 151 in cooperation with caulking portion 31a3 that is formed in a position lower than retainer holding surface 31a2. Retainer 151 includes cylindrical portion 151b, flange portion 151a extending radially outwardly from an upper end of cylindrical portion 151b so as to be bent relative to cylindrical portion 151b and surrounded between retainer holding surface 31a2 and caulking portion 31a3, and a closed end portion having spring retaining surface 151c on which one end of coil spring (first elastic member) 152 is retained.

The closed end portion has air hole 151d extending through a generally central portion of the closed end portion. With the provision of air hole 151d, atmospheric pressure can be always exerted on a lower portion of piston body 153 received in bore 31a.

Piston contact surface 31a1 is formed on the inner circumferential surface that defines bore 31a, on the side of the closed end of bore 31a. Piston contact surface 31a1 is brought into contact with piston surface 153h of piston body 153. Small-diameter cylindrical portion 31b that has a diameter smaller than a diameter of piston contact surface 31a1 is formed in a central portion of the closed end of bore 31a. Small-diameter cylindrical portion 31b is connected with fluid passage 13 communicated with pressure reducing valves 4FL, 4RR and 4FR, 4RL, and with fluid passage 10b communicated with the suction side of pump unit P. Pressure regulating valve accommodating bore 31c is formed on an upper side of small-diameter cylindrical portion 31b. Pressure regulating valve accommodating bore 31c serves as a fluid passage having a diameter smaller than that of bore 31a. Pressure regulating valve accommodating bore 31c has a cylindrical shape having central axis OR that is offset leftward from a central axis of bore 31a, i.e., central axis OP of piston body 153, as shown in FIG. 3. Pressure regulating valve accommodating bore 31c is connected with fluid passage 10a on an upper side thereof which is communicated with master cylinder M/C. Specifically, pressure regulating valve accommodating bore 31c is connected with fluid passage 10a through reduced diameter portion 31c1 that is a bottom of pressure regulating valve accommodating bore 31c. Fluid passage 10a is a small-diameter fluid passage that has a diameter smaller than that of pressure regulating valve accommodating bore 31c, and is arranged in series with respect to pressure regulating valve accommodating bore 31c. Pressure regulating valve accommodating bore 31c serves as a fluid passage having a diameter smaller than that of bore 31a.

Figure 4:
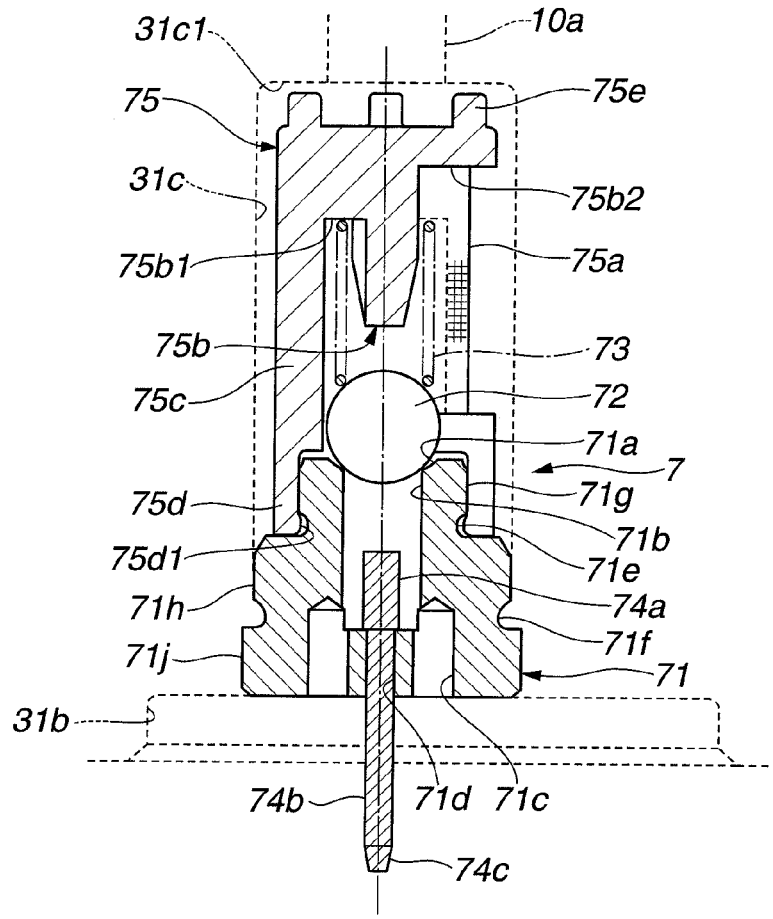
FIG. 4 is an enlarged cross section of a pressure regulating valve of the brake apparatus according to the embodiment.
Figure 5:
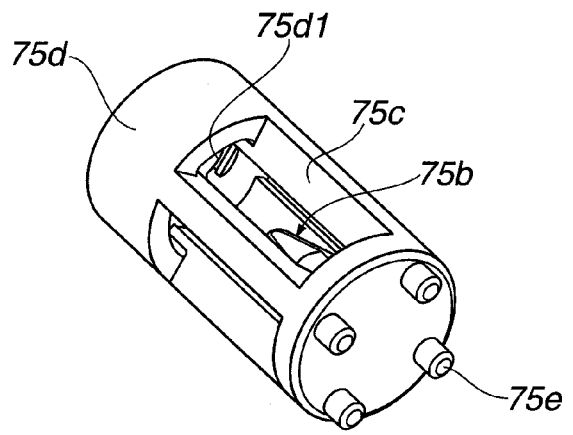
FIG. 5 is a perspective view of a filter member of the pressure regulating valve as shown in FIG. 4.

Pressure regulating valve accommodating bore 31c accommodates pressure regulating valve 7 and filter member 75 that removes impurities in the brake fluid flowed from fluid passage 10a into pressure regulating valve accommodating bore 31c. Pressure regulating valve 7 includes seat member 71 fitted to filter member 75. FIG. 4 is an enlarged cross section of pressure regulating valve 7. FIG. 5 is a perspective view of filter member 75 of pressure regulating valve 7. FIG. 6A is a bottom plan view of filter member 75. FIG. 6B is a cross section of filter member 75, taken along line C-C shown in FIG. 6C. FIG. 6C is a cross section of filter member 75, taken along line B-B shown in FIG. 6B. FIG. 4 shows pressure regulating valve 7 in a state in which rod 74 of pressure regulating valve 7 is located in a lowest position. Filter member 75 includes cylindrical mesh filter 75a, stop portion 75b acting as a stop for ball member 72 of pressure regulating valve 7, column portion 75c to which filter 75a is mounted, sleeve portion 75d connected with column portion 75c, and projecting portion 75e formed on column portion 75c. Column portion 75c is a framework of filter member 75 and accommodates filter 75a inside thereof. Sleeve portion 75d has an annular shape and is formed on a lower side of column portion 75c. Projecting portion 75e is formed on a crown surface of filter member 75 which is directed toward the side of fluid passage 10a, and ensures a fluid path of the brake fluid flowing from fluid passage 10a to filter 75a through pressure regulating valve accommodating bore 31c. Projecting portion 75e can be brought into contact with reduced diameter portion 31c1 of pressure regulating valve accommodating bore 31c. Even in such a case, projecting portion 75e can ensure the fluid path of the brake fluid flowing from fluid passage 10a to pressure regulating valve accommodating bore 31c. Filter member 75 has an outer diameter smaller than a diameter of pressure regulating valve accommodating bore 31c so that a fluid path between an outer circumferential surface of filter member 75 and a circumferential surface defining pressure regulating valve accommodating bore 31c is formed.

As shown in FIG. 6A to FIG. 6c, stop portion 75b includes cylindrical central stop portion 75ba extending to bottom surface 75b2 of filter member 75 in an axial direction of filter member 75, and four reinforcing portions 75bb that are equidistantly arranged on an outer circumferential surface of central stop portion 75ba. Each of reinforcing portions 75bb has a tapered surface tapered toward the side of sleeve portion 75d in the axial direction of filter member 75. Disposed between respective adjacent reinforcing portions 75bb is vertical groove 75bc extending in the axial direction of filter member 75. Spring retaining surface 75b1 is formed between stop portion 75b and column portion 75c and retains return spring 73 for pressure regulating valve 7. Spring retaining surface 75b1 is located in a position lower than bottom surface 75b2 of filter member 75, and is flush with a bottom of vertical groove 75bc of stop portion 75b. In other words, as shown in FIG. 4 and FIG. 6B, a thickness of filter member 75 at spring retaining surface 75b1 and the bottom of vertical groove 75bc is larger than that at bottom surface 75b2. Further, filter member 75 includes four engaging projections 75d1 that radially inwardly project from an inner circumferential surface of a lower end portion of sleeve portion 75d and are spaced from each other in a circumferential direction of sleeve portion 75d. Filter member 75 is made of a resin material.

Disposed in a space surrounded by an upper portion of seat member 71 and filter member 75 are ball member (valve element) 72 and return spring (second elastic member) 73 that biases ball member 72 toward seat member 71. Return spring 73 has an elastic force smaller than that of coil spring 152 such that in a condition where the brake fluid pressure is not applied to ball member 72, ball member 72 is upwardly pushed by the elastic force of coil spring 152 through rod 74. In this embodiment, return spring 73 is a coil spring. Rod 74 is contacted with ball member 72 such that an axis of rod 74 is in alignment with a center of ball member 72.

Seat member 71 is a cylindrical member having a plurality of steps. Seat member 71 includes upper cylindrical portion 71g to which filter member 75 is fitted, intermediate cylindrical portion 71h having an outer diameter that is larger than that of upper cylindrical portion 71g and substantially a same as the diameter of pressure regulating valve accommodating bore 31c, and lower cylindrical portion 71j having an outer diameter slightly larger than that of intermediate cylindrical portion 71h. . Engaging groove 71e is formed between upper cylindrical portion 71g and intermediate cylindrical portion 71h, and engaged with engaging projections 75d1 of filter member 75. Further, fitting groove 71f is formed between intermediate cylindrical portion 71h and lower cylindrical portion 71j, into which the material of housing 31 is fitted upon press-fitting pressure regulating valve 7 into pressure regulating valve accommodating bore 31c. When filter member 75 is assembled to seat member 71, upper cylindrical portion 71g of seat member 71 accommodating rod 74 is inserted into sleeve portion 75d of filter member 75, while retaining return spring 73 and ball member 72 within filter member 75. At this time, engaging projections 75d1 of filter member 75 and engaging groove 71e of seat member 71 are engaged with each other. Filter member 75 and seat member 71 are thus assembled together to form an integral part and constitute pressure regulating valve 7.

Seat member 71 includes through hole portion (rod outer circumferential passage portion) 71b that is formed on one end side of rod 74 (the side of upper end portion 74a). Through hole portion 71b receives rod 74 and cooperates with rod 74 to form a brake fluid passage between an outer circumferential surface of rod 74 and an inner circumferential surface of through hole portion 71b. Seat member 71 further includes rod supporting hole portion 71d that has an inner diameter smaller than an inner diameter of through hole portion 71b and supports the other end side of rod 74 (intermediate portion 74b) such that rod 74 is slidably movable in through hole portion 71b in an axial direction of rod 74. Seat member 71 further includes at least one communicating hole portion 71c (in this embodiment, a plurality of communicating hole portions 71c) that communicates through hole portion 71b and small-diameter cylindrical portion 31b of bore 31a with each other. Communicating hole portions 71c are formed in a lower portion of seat member 71 on a radial outside of rod supporting hole portion 71d so as to surround rod supporting hole portion 71d. Communicating hole portions 71c extend upwardly from a lower end of seat member 71, and are partially communicated with a lower end portion of through hole portion 71b. Frustoconical seat portion 71a is formed on an upper end side of through hole portion 71b which is opposed to ball member 72. When ball member 72 is seated on seat portion 71a, a fluid communication between fluid passage 10a and small-diameter cylindrical portion 31b of bore 31a is inhibited. On the other hand, when ball member 72 is pushed upwardly against the elastic force of return spring 73 by rod 74, the brake fluid supplied through fluid passage 10a is allowed to pass through filter 75a of filter member 75, the brake fluid passage formed between the outer circumferential surface of rod 74 and the inner circumferential surface of through hole portion 71b, and communicating hole portions 71c, and then flow into small-diameter cylindrical portion 31b.

A length of return spring 73 in a non-load condition is set to such a length that return spring 73 can always bias ball member 72 toward seat portion 71a of seat member 71. As explained above, filter member 75 and seat member 71 are formed as an integral part by engaging engaging projections 75d1 and engaging groove 71e with each other. Further, a slight clearance is formed between an upper end of filter member 75 (i.e., an upper end of each of projecting portion 75e) and the bottom 31c1 of pressure regulating valve accommodating bore 31c in order to eliminate an error in assembling. In this condition, even in a case where filter member 75 is disconnected and fallen off from seat member 71 and filter member 75 is brought into contact with the bottom 31c1 of pressure regulating valve accommodating bore 31c, the fluid path between fluid passage 10a and filter 75a can be still ensured by provision of projecting portion 75e, and ball member 72 can be still pressed against seat portion 71a of seat member 71 by the biasing force of return spring 73.

Rod 74 is a rod-shaped member made of metal. Rod 74 includes upper end portion 74a (the other end side of rod 74) that has a diameter larger than the inner diameter of rod supporting hole portion 71d and comes into contact with ball member 72, intermediate portion 74b (one end side of rod 74) that has a diameter substantially the same as the inner diameter of rod supporting hole portion 71d and a length longer than a length of upper end portion 74a, and lower end portion 74c that is gradually tapered from intermediate portion 74b and brought into contact with upper surface 155b of plate member 155 as explained later. Rod 74 is formed as a separate member from piston body 153. When piston body 153 is downwardly moved with a stroke longer than the length of intermediate portion 74b, lower end portion 74c is spaced apart from upper surface 155b of plate member 155. In other words, upper end portion 74a of rod 74 serves as a stop by contacting an upper end of rod supporting hole portion 71d. Further, rod 74 has a central axis aligned with central axis OR of pressure regulating valve accommodating bore 31c, and therefore, the central axis of rod 74 is disposed offset from central axis (rotation axis) OP of piston body 153.

Piston body 153 is a resin-molded member having a closed-ended cylindrical shape having inner bottom surface 153a1. An outer circumferential portion of piston body 153 includes upper outer circumferential portion 153f having an outer diameter slightly smaller than an inner diameter of bore 31a, annular grooved portion 153e that is formed on a lower side of upper outer circumferential portion 153f and engaged with annular seal member 154, seal member retaining portion 153d that retains annular seal member 154, reduced-diameter portion 153c formed on a lower side of seal member retaining portion 153d, and weld line formed portion 153b formed on a lower side of reduced-diameter portion 153c. . Seal member retaining portion 153d has an outer diameter substantially the same as the inner diameter of bore 31a. Reduced-diameter portion 153c has an outer diameter that is smaller than the inner diameter of bore 31a and substantially the same as the outer diameter of upper outer circumferential portion 153f. Weld line formed portion 153b has an outer diameter substantially the same as the inner diameter of bore 31a. Annular seal member 154 divides an annular clearance between the inner circumferential surface that defines bore 31a and an outer circumferential surface of piston body 153 into a fluid pressure chamber disposed on the upper side of annular seal member 154 and an air chamber disposed on the lower side of annular seal member 154.

The term "weld line" as used herein means a joint mark that is formed upon resin-molding (insert-molding), specifically, that is formed by two flows of a resin material when one of the two flows entering from a position apart from a gate into a mold cavity and the other flow entering into the mold cavity via another route are cooled and solidified while being merged with each other. Generally, the portion in which the weld line is formed tends to suffer from reduction in accuracy. In this embodiment, weld line formed portion 153b is disposed in a position lower than annular seal member 154, that is, in the air chamber. That is, piston body 153 is constructed such that the weld line is formed in a position in which high accuracy in sealability is not required. In other words, piston body 153 is constructed so as to suppress formation of the weld line in a portion in which accuracy in sealability is required.

Inner circumferential surface 153a of piston body 153 has a diameter slightly larger than outer diameter DS of coil spring 152. Inner bottom surface 153a1 of piston body 153 supports the other end of coil spring 152. Plate member 155 is disposed in a central area (i.e., crown surface 153j) of piston surface 153h formed on an upper surface of piston body 153. Plate member 155 is embedded in crown surface 153j by insert-molding. Plate member 155 is a hard member made of metal which has a hardness larger than that of the resin material of piston body 153. In this embodiment, plate member 155 is a disk-shaped member made of stainless steel and has outer diameter DP larger than outer diameter DS of coil spring 152.

Specifically, when the other end of coil spring 152 is retained by inner bottom surface 153a1 of piston body 153 made of the resin material, the elastic force of coil spring 152 is always exerted on inner bottom surface 153a1. If plate member 155 has an outer diameter smaller than the outer diameter of coil spring 152, plate member 155 and the contact portion of inner bottom surface 153a1 which is contacted with the other end of coil spring 152 are spaced apart from each other in a radial direction thereof, when viewed in an axial direction of piston body 153. As a result, a shearing force is exerted on the portion between crown surface 153j and inner bottom surface 153a1 to thereby cause deterioration in durability of piston body 153. In contrast, in a case where outer diameter DP of plate member 155 is larger than outer diameter DS of coil spring 152 as described in this embodiment, plate member 155 and the contact portion of inner bottom surface 153a1 which is contacted with the other end of coil spring 152 are overlapped with each other, when viewed in the axial direction of piston body 153. As a result, crown surface 153j undergoes only the elastic force of coil spring 152 and is free from a shearing force, and therefore, deterioration in durability of piston body 153 can be suppressed.

Figure 7:
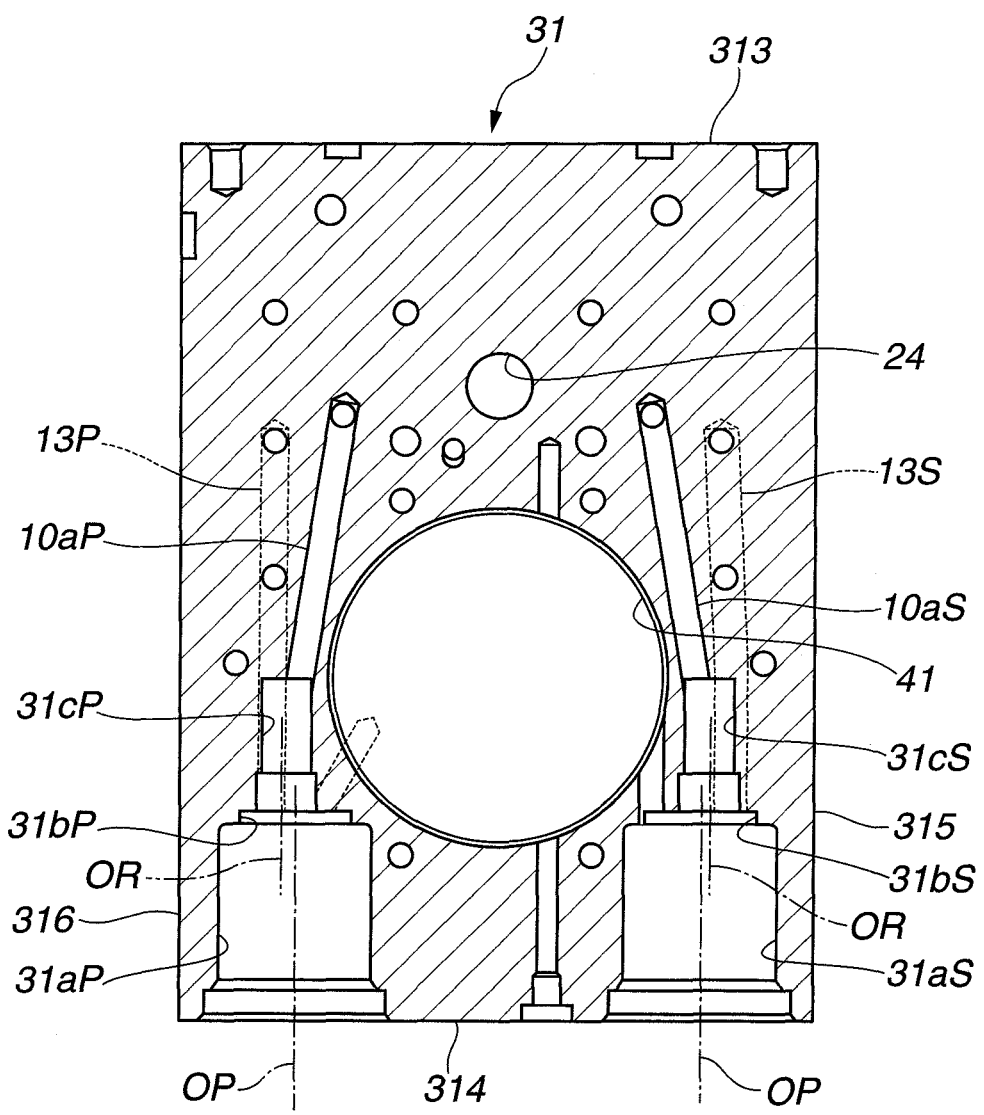
FIG. 7 is a cross section of the housing, taken along line A-A shown in FIG. 2B.

FIG. 7 is a cross section of housing 31, taken along line A-A shown in FIG. 2B. As shown in FIG. 7, closed-ended bore 31aP in which reservoir 15P of the P system is accommodated is located on the left side of housing 31, and closed-ended bore 31aS in which reservoir 15S of the S system is accommodated is located on the right side of housing 31. Central axis OR of pressure regulating valve accommodating bore 31cP communicated with closed-ended bore 31aP is located offset leftward from central axis OP of closed-ended bore 31aP as shown in FIG. 7. Similarly, central axis OR of pressure regulating valve accommodating bore 31cS communicated with closed-ended bore 31aS is located offset rightward from central axis OP of closed-ended bore 31aS as shown in FIG. 7. In other words, fluid passages 10aP, 10aS communicated with pressure regulating valve accommodating bores 31cP, 31cS are formed offset from central axis OP of piston body 153. Thus, pressure regulating valve accommodating bores 31cP, 31cS are arranged to be offset from respective central axes OP of piston bodies 153 in such a direction that pressure regulating valve accommodating bores 31cP, 31cS are spaced apart from each other. With this arrangement, a region between pressure regulating valve accommodating bores 31cP, 31cS can be increased. In addition, accommodating portion 41 in which pump unit P (i.e., rotary gear pumps PP, PS) is accommodated is formed immediately above reservoirs 15P, 15S. A space occupied by accommodating portion 41 is substantially determined on the basis of pump discharge capacity as required. Therefore, with the arrangement of pressure regulating valve accommodating bores 31cP, 31cS that are offset to be spaced apart from each other, freedom of layout of pump unit P (i.e., rotary gear pumps PP, PS) can be enhanced, and upsizing of housing 31 as a whole can be suppressed.

As explained above, the brake apparatus according to the embodiment of the present invention can attain the following functions and effects.

(1) The brake apparatus according to the embodiment includes housing 31, piston body 153 disposed within each of a pair of closed-ended bores 31aP, 31aS formed in housing 31, coil spring (first elastic member) 152 that biases piston body 153 toward a closed end of respective bores 31aP, 31aS, pressure regulating valve accommodating bore (fluid passage) 31cP, 31cS opened to the closed end of respective bores 31aP, 31aS and having a diameter smaller than a diameter of respective bores 31aP, 31aS, pressure regulating valve 7 disposed in pressure regulating valve accommodating bore 31cP, 31cS, pressure regulating valve 7 including ball member (valve element) 72, seat portion 71a that is brought into contact with ball member 72, rod 74 disposed between crown surface 153j of piston body 153 and ball member 72, rod 74 acting to move ball member 72 apart from seat portion 71a, and return spring (second elastic member) 73 having one end contacted with ball member 72 and biasing ball member 72 toward seat portion 71a, return spring 73 having an elastic force smaller than that of coil spring 152, and pump unit P (rotary gear pumps PP, PS) operative to suck brake fluid through pressure regulating valve 7. Pump unit P is disposed in a region between pressure regulating valve 7 disposed in pressure regulating valve accommodating bore 31cP, 31cS opened to the closed end of one of bores 31aP, 31aS and pressure regulating valve 7 disposed in pressure regulating valve accommodating bore 31cP, 31cS opened to the closed end of the other of bores 31aP, 31aS. Pressure regulating valve accommodating bores 31cP, 31cS are formed to be offset from respective central axes of piston bodies 153 in such a direction that pressure regulating valve accommodating bores 31cP, 31cS are spaced apart from each other.

With this construction, it is possible to ensure a space between pressure regulating valve accommodating bores 31cP, 31cS. As a result, freedom of layout of pump unit P constituted of rotary gear pumps PP, PS can be enhanced, and upsizing of housing 31 as a whole can be suppressed.

(2) The brake apparatus according to the embodiment further includes fluid passages (small-diameter fluid passages) 10a having a diameter smaller than that of respective pressure regulating valve accommodating bores 31cP, 31cS, fluid passages 10a being connected to respective pressure regulating valve accommodating bores 31cP, 31cS through reduced diameter portion 31c1 of respective pressure regulating valve accommodating bores 31cP, 31cS and arranged in series with respect to respective pressure regulating valve accommodating bores 31cP, 31cS, seat member 71 fixedly disposed within respective pressure regulating valve accommodating bores 31cP, 31cS and formed with seat portion 71a, a closed-ended cylindrical filter member 75 that is fixed to seat member 71 and retains the other end of return spring 73, and a plurality of projecting portions 75e formed on a crown surface of filter member 75, projecting portions 75e being engaged with reduced diameter portion 31c1 to allow the brake fluid to flow from fluid passages 10a to respective pressure regulating valve accommodating bores 31cP, 31cS. With this construction, even in a case where filter member 75 is fallen off from seat member 71, a flow of brake fluid directed from fluid passage 10a toward reservoir 15 can be ensured.

(3) In the brake apparatus according to the embodiment, return spring 73 of pressure regulating valve 7 is a coil spring, and a length of the coil spring in a non-load condition is set such that the coil spring is always capable of biasing ball member 72 toward seat portion 71a within respective pressure regulating valve accommodating bores 31cP, 31cS. With this construction, even in a case where filter member 75 is fallen off from seat member 71, ball member 72 can be still pressed against seat portion 71a by return spring 73.

This application is based on a prior Japanese Patent Application No. 2010-271206 filed on Dec. 6, 2010. The entire contents of the Japanese Patent Application No. 2010-271206 are hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A brake apparatus comprising:
a housing;
a pair of closed-ended bores formed in the housing;
a pair of piston bodies, each disposed within a respective closed-ended bore formed in the housing;
a first elastic member configured to bias a piston body toward a closed end of a respective bore;
a pair of fluid passages, wherein each fluid passage is opened to the closed end of a respective bore, wherein each fluid passage has a diameter smaller than a diameter the respective bore, and wherein the pair of fluid passages are formed to be offset from respective central axes of the piston bodies in such a direction that the pair of fluid passages are spaced apart from each other;
a pair of pressure regulating valves, each disposed in a respective fluid passage, and each pressure regulating valve including:
a valve element,
a seat portion brought into contact with the valve element,
a rod disposed between a crown surface of a respective piston body and the valve element, the rod configured to move the valve element apart from the seat portion, and
a second elastic member having one end contacted with the valve element and biasing the valve element toward the seat portion, the second elastic member having an elastic force smaller than that of the first elastic member; and
a rotary gear pump configured to suck brake fluid through the pair of pressure regulating valves, wherein the rotary gear pump is disposed in a region between the pair of pressure regulating valves;
a pair of small-diameter fluid passages, wherein each small-diameter fluid passage has a diameter smaller than that of a respective fluid passage to which the small-diameter fluid passage is connected, wherein each small-diameter fluid passage is connected to a reduced diameter portion of the respective fluid passage, and wherein each small-diameter fluid passage is arranged in series with respect to the respective fluid passage,
a seat member fixedly disposed within a respective fluid passage, and formed with a respective seat portion;
a closed-ended cylindrical filter member fixed to the seat member and retaining the other end of the second elastic member, the closed-ended cylindrical filter member including a plurality of projecting portions formed on a crown surface of the closed-ended cylindrical filter member, wherein each projecting portion is engaged with a reduced diameter portion in order to ensure a fluid path of the brake fluid flowing from the respective small-diameter fluid passage to the respective fluid passage.

2. The brake apparatus as claimed in claim 1, wherein the rotary gear pump is disposed in a region between the fluid passages.

3. The brake apparatus as claimed in claim 1, wherein the second elastic member is a coil spring, a length of the coil spring in a non-load condition being set such that the coil spring is configured to always bias the valve element toward the seat portion within the respective fluid passages.

4. The brake apparatus as claimed in claim 1, wherein each of the pressure regulating valves includes:

a rod supporting hole portion that supports one end side of the rod such that the rod is slidably moveable in the rod supporting hole portion in an axial direction of the rod,
a rod outer circumferential passage portion formed on the other end side of the rod and has an inner diameter larger than an inner diameter of the rod supporting hole portion, and
at least one communicating hole portion that communicates the rod outer circumferential passage portion and the respective bores.

5. The brake apparatus as claimed in claim 4, further comprising a seat member fixedly disposed within the respective fluid passages and formed with the seat portion, wherein the rod supporting hole portion, the rod outer circumferential passage portion and the communicating hole portion are formed in the seat member.

6. The brake apparatus as claimed in claim 5, wherein the rod outer circumferential passage portion and the communicating hole portion are overlapped with each other in a radial direction of the rod.

7. A brake apparatus comprising:
a housing;
a pair of closed-ended bores formed in the housing;
a pair of piston bodies, each disposed within a respective closed-ended bore formed in the housing;
a first elastic member configured to bias a piston body toward a closed end of a respective bore;
a pair of fluid passages, wherein each fluid passage is opened to the closed end of a respective bore, wherein each fluid passage has a diameter smaller than a diameter the respective bore, and wherein the pair of fluid passages are formed to be offset from respective central axes of the piston bodies in such a direction that the pair of fluid passages are spaced apart from each other;
a pair of pressure regulating valves, each disposed in a respective fluid passage, and each pressure regulating valve including:
a valve element,
a seat portion brought into contact with the valve element,
a rod disposed between a crown surface of a respective piston body and the valve element, the rod configured to move the valve element apart from the seat portion, and
a second elastic member having one end contacted with the valve element and biasing the valve element toward the seat portion, the second elastic member having an elastic force smaller than that of the first elastic member; and
a rotary gear pump configured to suck brake fluid through the pair of pressure regulating valves, wherein the rotary gear pump is disposed in a region between the pair of pressure regulating valves;
wherein the piston body is a resin-molded member and has a hard member on a crown surface thereof, the hard member having a hardness larger than that of a resin material of the piston body, and the piston body and the rod are brought into contact with each other via the hard member.

8. The brake apparatus as claimed in claim 7, wherein the hard member is a plate member, the plate member being integrally formed with a piston body.

9. The brake apparatus as claimed in claim 8, wherein the plate member has a disk shape, the first elastic member is a coil spring, the piston body has a closed-ended cylindrical shape, the coil spring is supported by an inner bottom surface of the piston body, and the plate member has a diameter larger than an outer diameter of the coil spring.

10. The brake apparatus as claimed in claim 9, wherein the plate member has a diameter larger than a maximum stroke amount of the piston body.

11. A brake apparatus comprising:
   a housing;
   a pair of closed-ended bores formed in the housing;
   a pair of piston bodies, each disposed within a respective bore;
   a pair of retainers, each fixed to an open end portion of a respective bore;
   a first elastic member retained between the retainer and a piston body, and configured to bias the piston body toward a closed end of the respective bore;
   a pair of fluid passages, each opened to the closed end of a respective bore;
   a pair of pressure regulating valves, each disposed in a respective fluid passage, each pressure regulating valve including:
      a valve element,
      a seat portion brought into contact with the valve element,
      a rod disposed between a crown surface of the respective piston body and the valve element, the rod configured to move the valve element apart from the seat portion, and
      a second elastic member having one end contacted with the valve element and biasing the valve element toward the seat portion, the second elastic member having an elastic force smaller than that of the first elastic member,
   a rotary gear pump configured to suck brake fluid through the pair of pressure regulating valves; and
   a motor mounted to a front surface of the housing, and configured to drive the rotary gear pump;
   a pair of small-diameter fluid passages, wherein each small-diameter fluid passage has a diameter smaller than that of a respective fluid passage to which the small-diameter fluid passage is connected, wherein each small-diameter fluid passage is connected to a reduced diameter portion of the respective fluid passage, and wherein each small-diameter fluid passage is arranged in series with respect to the respective fluid passage,
   a seat member fixedly disposed within the respective fluid passage, and formed with the seat portion;
   a closed-ended cylindrical filter member fixed to the seat member and retaining the other end of the second elastic member, the closed-ended cylindrical filter member including a plurality of projecting portions formed on a crown surface of the closed-ended cylindrical filter member, wherein each projecting portion is engaged with a respective reduced diameter portion to allow the brake fluid to flow from the respective small-diameter fluid passage to the respective fluid passage;
   wherein when viewed from a side surface of the housing, the rotary gear pump is disposed in a region between the pair of fluid passages;
   wherein the pair of fluid passages are formed to be offset from respective central axes of the piston bodies in such a direction that the pair of fluid passages are spaced apart from each other;
   wherein the rotary gear pump is disposed in a region between the pressure regulating valves; and
   wherein the respective fluid passages have a diameter smaller than a diameter of the respective bores.

12. The brake apparatus as claimed in claim 11, wherein the second elastic member includes a coil spring, and wherein a length of the coil spring in a non-load condition is set such that the coil spring is configured to always bias the valve element toward the seat portion within the respective fluid passages.

* * * * *